Patented July 12, 1938

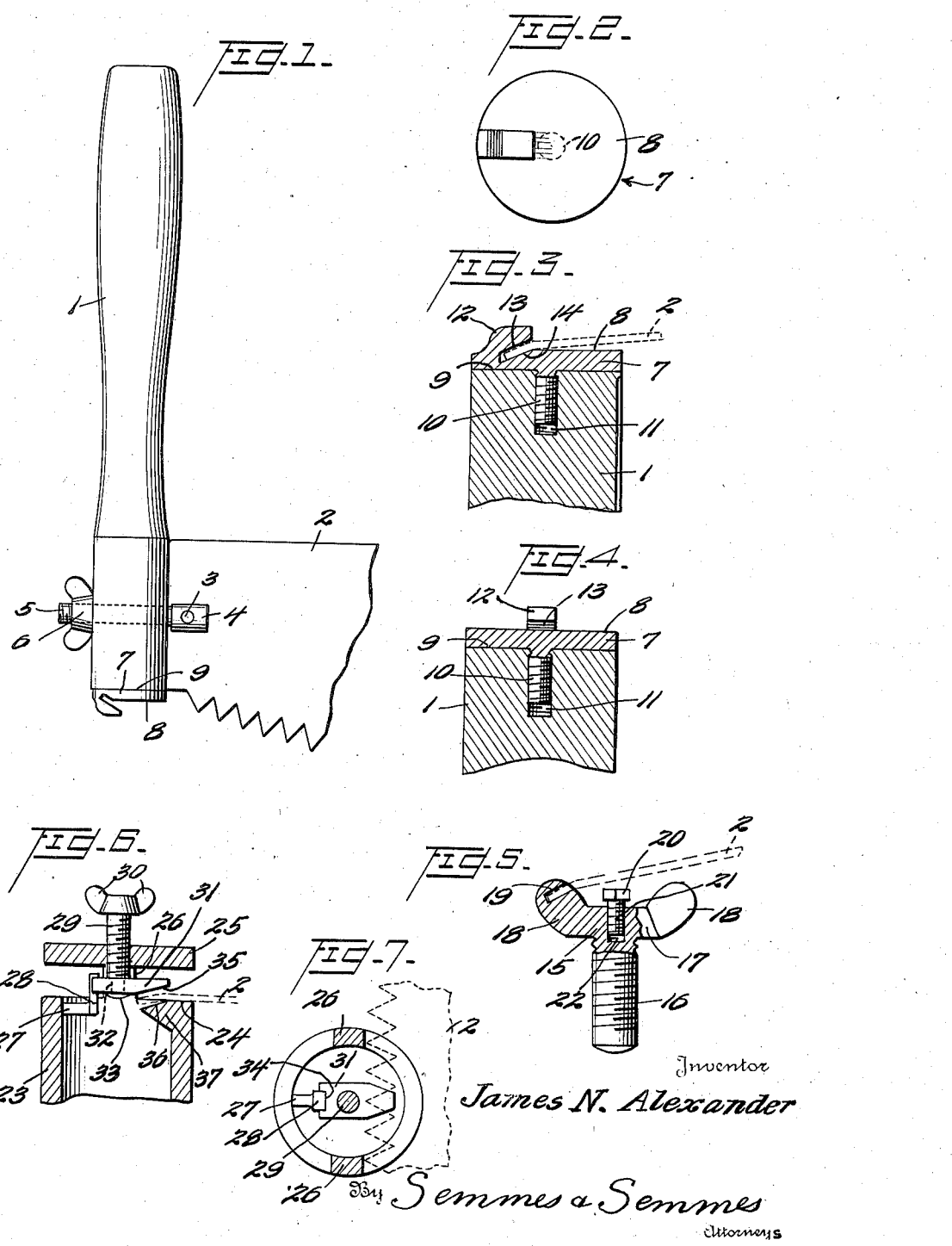

2,123,296

UNITED STATES PATENT OFFICE 2,123,296

SAW TOOTH SETTER

James N. Alexander, Birmingham, Ala.

Application August 18, 1934, Serial No. 740,515

1 Claim. (Cl. 76—66)

My invention relates to means for setting the teeth of saws and, while it is shown in connection with crosscut saws, it is obvious that it may be used to set teeth of handsaws or other types of saws on which the teeth must be set at an angle to the flat of the blade.

An object of my invention is to have a means ready at all times, and carried by the handle of the saw, for effecting the setting of the teeth of the saw.

Another object of my invention is to have a tooth-setting mechanism which is simple in design, strong, easily and cheaply manufactured, and easy to repair and replace.

With these and other objects in view, which may be incident to my improvements, the invention consists in the parts and combinations to be hereinafter set forth and claimed, with the understanding that the several necessary elements comprising my invention may be varied in construction, proportions, and arrangement, without departing from the spirit and scope of the appended claim.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing:

Figure 1 is a side view of a form of my tooth-setting mechanism applied to a crosscut saw handle, a portion of the blade of the crosscut saw being shown fragmentarily.

Figure 2 is an end view of the setting mechanism.

Figure 3 is a cross sectional view taken through the middle of the handle and showing in detail the tooth-setting mechanism.

Figure 4 is a view similar to Figure 3, taken at right angles thereto.

Figure 5 is a side view partly in section, showing a modified form of construction for the setting of teeth of a saw.

Figure 6 is a view in section through the end of a handle, showing another modified form of tooth-setting mechanism.

Figure 7 is a top plan view, with the head of the bolt support removed, of the form of device shown in Figure 6.

Referring to the drawing, I have shown a crosscut saw handle 1 to which is attached a crosscut blade 2. To the blade is attached a pin 3 which passes through a bifurcated holding member 4 to which is attached a bolt 5. A wing nut 6 holds the saw blade 2 firmly in place against the handle.

Mounted on the end of the handle and ready for instant use is a tooth-setting member, having a body 7 which is provided with a relatively flat upper surface 8. There is a flat lower surface 9. Integrally formed with the body 7 is a bolt 10 which is screw-threaded and fits into a screw-threaded aperture 11 formed on the handle 1. The handle 1 may be formed, if desired, of some metal such as aluminum.

On the upper flat surface 8 of the tooth-setting member 7 is a raised portion 12, and therein is provided a slot comprising parallel surfaces 13 and 14, the slot being at an angle to the flat surface 8 of the tooth-setting mechanism 7.

The angle of the slot itself is such that when a tooth is inserted, as indicated in dotted lines in Figure 3, in the slot formed between the substantially parallel surfaces 13 and 14, and the flat of the saw blade 2 is brought against the flat upper surface 8, the tooth will be set at the proper angle for efficient operation of the saw.

It is obvious that the teeth are set in opposite directions, and that in practice the teeth are set in the direction which they should take to insure proper operation of the saw.

This device is simple and strong. It is always ready in place, and provides a sure method of properly setting the teeth of the saw at a proper angle.

In Figure 5 I have shown another mechanism. Here I have provided a wing bolt 15 having a screw-threaded extension 16 which is adapted to fit in the screw-threaded aperture 11 of the saw handle. The wing bolt is provided with a head 17 and two angularly disposed wing members 18. In either one, or both, of these angularly disposed wing members 18 there can be formed a slot such as is shown at 19 in one of these wings. This slot 19 is for the purpose of receiving a saw tooth. When the saw tooth is inserted in the slot 19, the flat of the saw is pressed downwardly against a head 20 of a set bolt 21 which is screwed into a screw-threaded aperture 22 formed in the head 17 of the wing bolt. By adjusting the position of the head 20 of the set bolt, the setting which will be given to a tooth of the saw can be properly regulated.

Referring now to Figures 6 and 7, I have shown a form of device, in which I have a saw handle 23, which may be hollow, or solid. In the present instance I have shown a hollow handle. On the hollow handle is formed a flat portion 24. Raised from the flat portion 24 is a support 25 which is supported by two support spiders 26, as shown in Figure 7. All this may be integrally formed with the metal of the handle, if desired. Mounted on the inside of the hollow handle 23 is a guide support 27 having a guide member supported thereby which I have indicated by the numeral 28.

Screwed into the support 25 is a screw-threaded bolt 29 having a wing construction 30 permitting the bolt to be readily turned. Carried at the bottom of the bolt 29 is a clamping head 31 which is mounted on an extension 32 of the wing bolt and is held in place by riveting or otherwise, as indicated at 33. The clamping head 31 is rotatably mounted on the bolt 29. The clamping head 31 is provided with a groove 34 in which fits the guide piece 28. On the lower surface of the clamping head 31 is positioned a surface 35 which is adapted, in operation, to maintain a substantially parallel relationship to a sloped surface 36 formed on an extension 37 which projects inwardly towards the center of the hollow handle 23.

In operation, the flat of the saw blade 2 is laid against the flat surface 24, and a saw tooth is adapted to be gripped between the substantially parallel sloped surfaces 35 and 36 of the clamping head 31 and the projecting member 37, respectively. The saw tooth having been inserted between these surfaces 35 and 36, upon turning the wing bolt the clamping head is moved downwardly to bend the tooth to its proper set, as is apparent from Figures 6 and 7 of the drawing. Rotation of the clamping head is prevented by reason of the engagement of the guide 28 with the slot 34 formed in the clamping head 31, but reciprocation under the action of the bolt 29 is permitted, and considerable pressure can be exerted on a tooth to bend it to the proper set.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claim.

I claim:

In a saw set, a handle provided with a recess, a support spaced from the end thereof and secured thereto by means of two spaced spiders, a clamping head between said support and end, a portion of one surface of which is sloped, screw-threaded means mounted in the support and rotatably secured to said clamping head, a sloped surface formed on said end projecting into the recess and being substantially parallel to the sloped surface of the clamping head, a flat surface formed on the handle and adjacent said sloped surface formed thereon whereby the flat of a saw blade may be laid on the flat surface on the handle and a tooth set by being placed between the sloped surface on the handle and the sloped surface portion on the clamping head by the movement of the clamping head through said screw-threaded means, said clamping head being provided with a groove, and a substantially L-shaped guide piece one leg of which fits in said groove whereby reciprocation of the clamping head is permitted without rotation thereof, the extremity of the other leg being secured to the inner wall of the recess in the said handle.

JAMES N. ALEXANDER.